United States Patent
Kalonji et al.

(10) Patent No.: US 7,765,583 B2
(45) Date of Patent: Jul. 27, 2010

(54) SYSTEM AND METHOD FOR MANAGING VIRTUAL USER DOMAINS

(75) Inventors: Ndiata Kalonji, South San Francisco, CA (US); Lance Pham, South San Francisco, CA (US)

(73) Assignee: France Telecom, Paris (FR)

( * ) Notice: Subject to any disclaimer, the term of this patent is extended or adjusted under 35 U.S.C. 154(b) by 1490 days.

(21) Appl. No.: 11/066,437

(22) Filed: Feb. 28, 2005

(65) Prior Publication Data

US 2006/0195888 A1  Aug. 31, 2006

(51) Int. Cl.
*G06F 7/04* (2006.01)
*G06F 15/16* (2006.01)
*G06F 17/30* (2006.01)
*H04L 29/06* (2006.01)

(52) U.S. Cl. .......................................... 726/4; 713/182
(58) Field of Classification Search ................ 713/182, 713/183; 726/4
See application file for complete search history.

(56) References Cited

U.S. PATENT DOCUMENTS

| | | | | |
|---|---|---|---|---|
| 5,796,424 A * | 8/1998 | Ely et al. | ..................... | 348/14.1 |
| 6,252,952 B1 * | 6/2001 | Kung et al. | ............... | 379/114.1 |
| 6,496,824 B1 * | 12/2002 | Wilf | ................................... | 1/1 |
| 6,526,582 B1 * | 2/2003 | Brodigan et al. | ............... | 725/87 |
| 6,587,836 B1 * | 7/2003 | Ahlberg et al. | ................. | 705/26 |
| 6,690,675 B1 * | 2/2004 | Kung et al. | .................. | 370/401 |
| 6,775,267 B1 * | 8/2004 | Kung et al. | .................. | 370/352 |
| 6,795,707 B2 * | 9/2004 | Martin et al. | ................ | 455/446 |
| 6,963,579 B2 * | 11/2005 | Suri | ........................... | 370/420 |
| 7,289,489 B1 * | 10/2007 | Kung et al. | .................. | 370/352 |
| 7,299,488 B2 * | 11/2007 | Brodigan et al. | ............ | 725/119 |
| 7,386,873 B2 * | 6/2008 | Brodigan | .................... | 725/119 |
| 7,430,187 B2 * | 9/2008 | Holt et al. | .................... | 370/329 |
| 7,448,075 B2 * | 11/2008 | Morand et al. | ................. | 726/7 |
| 7,460,588 B2 * | 12/2008 | Rhee et al. | .................... | 375/222 |
| 7,496,647 B2 * | 2/2009 | Karaoguz et al. | ........... | 709/223 |
| 7,536,460 B2 * | 5/2009 | Anschutz et al. | ............ | 709/226 |
| 7,567,578 B2 * | 7/2009 | Suri | .......................... | 370/401 |
| 2001/0049620 A1 * | 12/2001 | Blasko | ........................ | 705/10 |
| 2002/0033416 A1 * | 3/2002 | Gerszberg et al. | ........... | 235/380 |
| 2002/0049635 A1 * | 4/2002 | Mai et al. | ...................... | 705/14 |
| 2002/0049806 A1 * | 4/2002 | Gatz et al. | .................. | 709/203 |
| 2002/0054087 A1 * | 5/2002 | Noll et al. | .................... | 345/744 |
| 2002/0116282 A1 * | 8/2002 | Martin et al. | .................. | 705/26 |
| 2002/0120519 A1 * | 8/2002 | Martin et al. | .................. | 705/21 |
| 2002/0131436 A1 * | 9/2002 | Suri | ........................... | 370/419 |
| 2002/0133578 A1 * | 9/2002 | Wu | .............................. | 709/222 |
| 2002/0194334 A1 * | 12/2002 | Focant et al. | ................. | 709/225 |
| 2002/0194615 A1 * | 12/2002 | Brodigan et al. | ............ | 725/119 |
| 2002/0194616 A1 * | 12/2002 | Brodigan | .................... | 725/119 |

(Continued)

*Primary Examiner*—David García Cervetti
(74) *Attorney, Agent, or Firm*—Oblon, Spivak, McClelland, Maier & Neustadt, L.L.P.

(57) ABSTRACT

The present invention addresses the previous of lack of subscriber identity tracking and management for residential broadband lines and provides customized access and enhanced IP services for a subscriber's household members (virtual user domain) and his/her circle of extended families, relatives, and friends (multiple virtual user domains). Rather than treating a broadband link as a single connection with a single set of services and quality constraints, the present invention enables the subscriber to create multiple user profiles per broadband link; tailor activities such as web services to a specific user and group profile; provide restricted access to minors (e.g. allow only age appropriate content to be viewed); and facilitate connection at multiple access points on a carrier's edge network.

7 Claims, 2 Drawing Sheets

U.S. PATENT DOCUMENTS

| | | | |
|---|---|---|---|
| 2004/0117845 A1* | 6/2004 | Karaoguz et al. | 725/134 |
| 2004/0250273 A1* | 12/2004 | Swix et al. | 725/25 |
| 2004/0255326 A1* | 12/2004 | Hicks et al. | 725/81 |
| 2004/0261112 A1* | 12/2004 | Hicks et al. | 725/89 |
| 2005/0039050 A1* | 2/2005 | Morand et al. | 713/201 |
| 2005/0044225 A1* | 2/2005 | Ota et al. | 709/225 |
| 2005/0086694 A1* | 4/2005 | Hicks et al. | 725/79 |
| 2005/0132295 A1* | 6/2005 | Noll et al. | 715/744 |
| 2005/0144297 A1* | 6/2005 | Dahlstrom et al. | 709/229 |
| 2005/0160185 A1* | 7/2005 | Matsuura et al. | 710/1 |
| 2005/0283479 A1* | 12/2005 | Wahl et al. | 707/9 |
| 2005/0283532 A1* | 12/2005 | Kim et al. | 709/225 |
| 2005/0283600 A1* | 12/2005 | Giannotti et al. | 713/2 |
| 2005/0283828 A1* | 12/2005 | Perley et al. | 726/4 |
| 2006/0020784 A1* | 1/2006 | Jonker et al. | 713/157 |
| 2006/0041915 A1* | 2/2006 | Dimitrova et al. | 725/81 |
| 2006/0114897 A1* | 6/2006 | Suri | 370/389 |
| 2006/0173792 A1* | 8/2006 | Glass | 705/75 |
| 2006/0173793 A1* | 8/2006 | Glass | 705/75 |
| 2006/0198430 A1* | 9/2006 | Rhee et al. | 375/222 |
| 2006/0248332 A1* | 11/2006 | Kim et al. | 713/155 |
| 2007/0107017 A1* | 5/2007 | Angel et al. | 725/62 |
| 2007/0143456 A1* | 6/2007 | Mashinsky | 709/223 |
| 2008/0049767 A1* | 2/2008 | Koltenuk | 370/401 |
| 2008/0120669 A1* | 5/2008 | Brodigan et al. | 725/114 |

* cited by examiner

SYSTEM AND METHOD FOR MANAGING VIRTUAL USER DOMAINS

BACKGROUND OF THE INVENTION

1. Field of the Invention

The present invention is directed to a method and system for managing configurable services provided to a group of users, and in one embodiment to a method and system for managing user-centric services in a virtual user domain.

2. Discussion of the Background

Currently, residential users login in to a network (e.g., a telephone-, cable- or DSL-based network) of a carrier or service provider by creating an active session (e.g., a DSL pppoa or pppoe session). Often, because of the underlying technology (e.g., DSL and ATM), the residential connection requires neither a login name nor password. The circuit is simply provisioned at the central office without requiring much set up at the customer premise. The customer premise equipment, usually a standalone DSL or cable modem, is either preconfigured or requires minimum configuration and plugs into a provisioned RJ-11 line (WAN interface) or coaxial cable connection going out of the home.

For multiple nodes (e.g., PCs, laptops, access points, VoIP phones) to connect on the same line, a router is connected to the LAN interface of the modem and provides DHCP and NAT services that enable all nodes on the LAN to connect to the Internet. All these nodes' private IP addresses are translated to a single internet address (i.e., the address of the router), and the router performs port (TCP/UDP port) translation services. The outgoing connections are configured to look like they come from a usually different port number at the router, and incoming connections are converted to ports on the nodes as specified at the router. This dual translation allows multiple nodes to share a single IP address with respect to nodes not on the user's network, while still allowing each of the nodes to make separate connections to the Internet.

In the context of a DSL connection, the DSL subscriber known to the carrier is in fact no more than an ATM circuit id referenced to the billing and service address of the payer. Similarly, for a cable-based connection, the cable subscriber is nothing more than a cable modem MAC address referenced to the billing and service address of the payer. All traffic is classified as best effort (BE) "up to" some published downstream or upstream data rate.

The advancement of user sessions and flow management techniques at layer 7 holds promise in delivering high quality IP formatted content to the home. Additionally, the maturity and adoption of new broadband access technology such as VDSL, Ethernet, Wi-Max, and optical fiber are enabling telecommunication carriers and MSOs to deliver a richer product portfolio that includes voice, data, and video with user flexibility and at the service quality worth paying for. However, with the current subscriber access and aggregation architecture, there are several subscriber elements missing that cannot allow the paying subscriber to monitor, control, or manage usage of his broadband connection; enable nomadic access with trusted domain, and maintain personalized access profiles.

SUMMARY OF THE INVENTION

The present invention is directed to increasing the amount of customization of services at or within the residence of a residential gateway. As such, the present invention addresses the previous lack of subscriber identity tracking and management for residential broadband lines. The present invention provides customized access and enhanced IP services for a subscriber's household members (virtual user domain) and his/her circle of extended families, relatives, and friends (multiple virtual user domains).

Rather than treating a broadband link as a single connection with a single set of services and quality constraints, the present invention enables the subscriber to create multiple user profiles per broadband link; tailor activities such as web services to a specific user and group profile; provide restricted access to minors (e.g. allow only age appropriate content to be viewed); and facilitate connection at multiple access points on a carrier's edge network.

Each user's identity and access privileges may also change over time, and the present invention allows the user and virtual user domain to be updated, managed, and protected. This enables the root broadband subscriber to create his own virtual domain that include rich user profiles with varying privileges and restrictions that can connect at any point within the carrier's or service provider's edge network. Additionally, inter-user domain access (e.g. is user2.root1@domain1 accessing the network through domain2's connection point) is also possible based upon a rich set of profile parameters that can be understood between trusted domains. This is one aspect of enabling nomadic broadband usage.

BRIEF DESCRIPTION OF THE DRAWINGS

These and other advantages of the invention will become more apparent and more readily appreciated from the following detailed description of the exemplary embodiments of the invention taken in conjunction with the accompanying drawings, where.

DETAILED DESCRIPTION OF THE PREFERRED EMBODIMENTS

Figure 1:
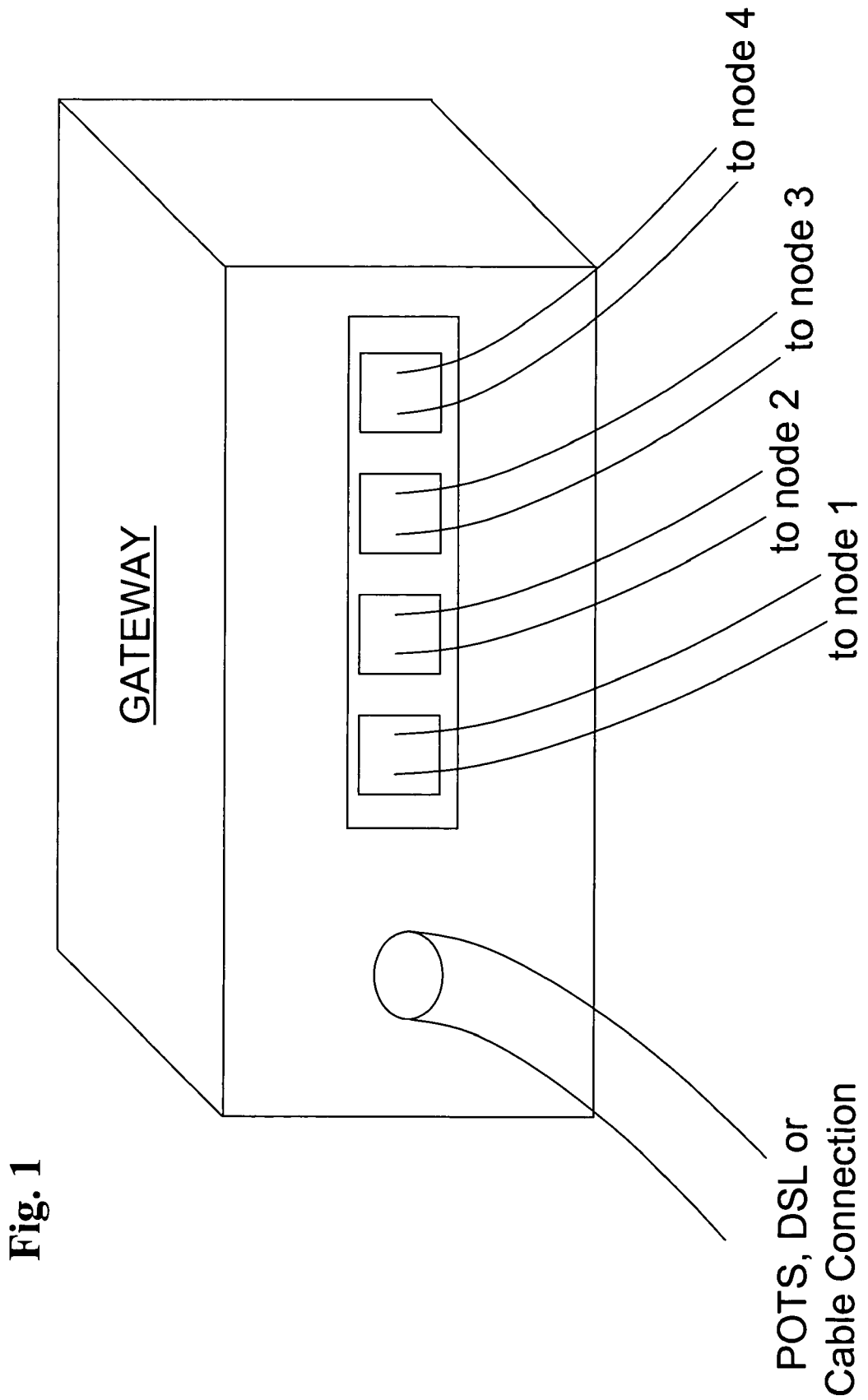
FIG. 1 is an illustration of an exemplary residential gateway for performing translation and domain services according to the present invention.

Turning now to a description of exemplary embodiments and features of the present invention, FIG. 1 is an illustration of an exemplary residential gateway for performing translation and domain services according to the present invention. The gateway includes an outgoing data link that can be in the form of (1) a physical connection to the outside world (e.g., a coaxial cable, a DSL line or a standard telephone line) or (2) a data communications link (e.g., an Ethernet or USB link) that connects the gateway to a modem that is in turn connected to a physical connection to the outside world (e.g., a coaxial cable, a DSL line or a standard telephone line). The outgoing data link is typically, but not always, a broadband link to the external world.

The gateway also includes at least one incoming link that connects the gateway to various nodes internal to the network. Such incoming links are generally in the form of a wired connection (e.g., such as an Ethernet link) or a wireless connection (e.g., a WiFi-Max connection or an 802.11x connection, where "x" represents one of the family of standards such as "a", "b", or "g").

Figure 2:
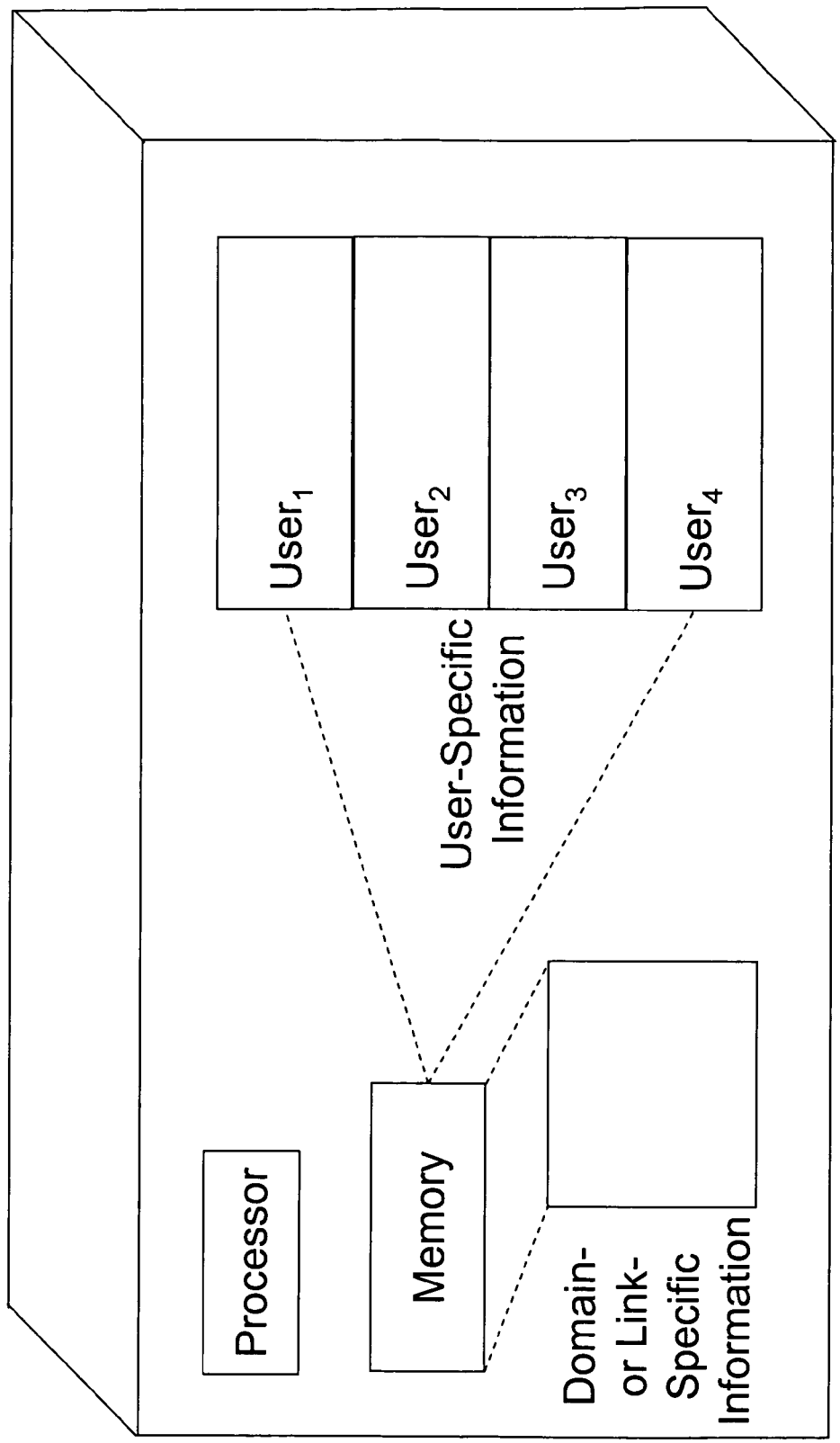
FIG. 2 is an illustration of the internals of the exemplary residential gateway of FIG. 1, including the domain specific and user-specific information stored in at least one memory of the residential gateway.

As shown in FIG. 2, internally the residential gateway of FIG. 1 includes a processor and memory for providing domain specific and user-specific services as well as conventional services, such as DHCP and network address translation. By connecting to the residential gateway (e.g., using a web browser connected to the gateway from within the residential network or from external to residential gateway), services such as shown in Table 1 below can be performed by an authorized user with the help of the gateway, as will be discussed in more detail below.

An example of how virtual user domains can be managed by the present invention is provided below. For the purpose of the example, it is assumed that John Smith has a premium ISP and DSL service subscription with a service provider SP. He and his wife, Mrs. Catherine Smith, have two children and one niece living with them. John Smith Jr, Sarah Smith, and Karen Lee are 17, 8 and 9, respectively. Using the SP's service, John establishes his virtual domain called JohnSmith@114087891452.sp.ext, where "ext" represents a network extension such as "com" or "net" or even an international extension such as "co.jp". Mr. Smith, as the contact point for his service provider, is given administrative right to this domain, and creates other user profiles under this domain. Those profiles are identified as followed:

CatherineSmith@114087891452.sp.ext
JohnSmithJr@114087891452.sp.ext
SarahSmith@114087891452.sp.ext
KarenLee@114087891452.sp.ext Each of these 114087891452.sp.ext subscribers has various levels of access with regard voice, data, and video services that can be provided across the outgoing data link. Initially, Mr. Smith configures Catherine as an operator of the domain, while John Jr, Sarah, and Karen are configured as normal users. Thus, in this example, the profiles are organized at different levels, e.g., (1) domain owner or administrator rights, (2) normal subscriber rights and (3) visitor rights.

Turning to domain owner or administrator rights first, those rights enable services such as those listed in Table 1 below. In the example, Mr. Smith acts as the administrator of the virtual user domain (114087891452.sp.ext) that he has created through his service provider. His administrator rights are associated with his full identify (i.e., JohnSmith@114087891452.sp.ext) within the user domain. Using the associated rights, Mr. Smith is able to create the other user identities described above (e.g., SarahSmith@114087891452.sp.ext). In addition, Mr. Smith may then set restrictions on the newly created account (or update restrictions on previously created accounts) such as restrictions on the video channel viewing of the associated user. Such restrictions might include restricting viewing to pre-defined, age appropriate channels group, which John can customize by deleting or adding to the group under the pool of broadcast channels John had purchased in his subscriber package. For example, John creates a first group of channels that are considered appropriate for those under 13, a second group of channels that are considered appropriate for those 17 and under, and a third group of channels for adults only. Having created each of these groups, John then associates Sarah and KarenLee with the first group of channels, John Jr. with the second group of channels, and himself and Catherine with the third group of channels.

TABLE 1

User Domain Administrator Functionality
  Manage User Domain Accounts
    Check account login against central user
    Check certificate and authentication
      Manage rekey intervals and changes
    Check group and individual access
    Modify/add user accounts TABLE 1-continued Modify/Order access services from service provider
  Create User Profile and Access Policies
    Select video channels for viewing
      Create/customize categories and grouping
      Set usage limit per time period (e.g., day, week or month)
    Create VoIP number blocking
    Create IRC filter
    Create time schedule for various types of users
    Create data access filter list (e.g., for web sites)
  Manage Remote Access via Another User Domain
  Manage login trace options per domain
  Manage trust relationship per local domain
Analyze Usage Statistics Similarly, John can use his rights to (1) block Sarah's voice usage from certain phone numbers (e.g. adult entertainment entities) and (2) restrict her broadband activities to evening hours not to exceed 10 pm during school days. Moreover, with data access, various filters can be set to act as content controls.

Administrators are not the only users that can manage rights under the present invention. Users can, to the extent permitted by the administrator, manage their own user-specific information. For example, Table 2 below shows exemplary services that can be controlled by the user, if so authorized by the administrator.

TABLE 2

User Domain Subscriber Rights
  Retrieve user statistics from another domain
  Manage options on personal account
    Manage video channel group configured by domain administrator
      Set video preferences/options, such as play list
      View custom grouping and sire services links
    Manage VoIP call list (within conditions specified by the administrator)
      Set VoIP feature options
    Navigate the Internet (within conditions specified by the administrator)

Several technologies may be combined and customized to create a broadband virtual user domain in which subscribers in the domain can receive a rich set of value-add access intelligence. An example of an implementation leverages LDAP and Microsoft Active Directory Service Interface (ADSI). Once a client node attempts to connect to the internet, the user will be directed to logon to the gateway (e.g., that utilizes LDAP-compliant services) to obtain descriptive, attribute-based data. A simple example is shown in Table 3 below.

TABLE 3

| String | Attribute | type |
|---|---|---|
| DC | domainComponent | FT.com |
| CN | commonName | Catherine Smith |
| OU | organizationalUnitName | 114087891452 |
| O | organizationName | 114087891452 |
| STREET | streetAddress | 7001 Gateway Blvd |
| L | localityName | South San Francisco |
| ST | stateOrProvinceName | California |
| C | countryName | USA |
| UID | userid | Catherine@114087891452.sp.ext |

The User Domain Directory Services can start, stop, search, sort, and perform results and error handling. The Directory Services may replicate data widely to increase availability and reliability, and consequently reduce response time. When directory data is replicated, temporary inconsistencies between the replicas may be acceptable—as long as all the replicas are updated eventually—depending on the particular role of the directory.

There are many methods used to provide a directory service. Different methods allow various types of data to be stored in a directory, require the data to be referenced, queried, updated, protected, and so on. Some directory services are local, providing service to a restricted context. Other services are global, providing service to a much broader context, for example, the entire Internet. Global services are usually distributed, meaning that the data they contain is shared across many computers which cooperate to provide the directory service. Typically, a global service defines a uniform namespace, which gives the same view of the data regardless of where the computer is in relation to the data.

In conjunction with LDAP technology, Microsoft Active Directory also presents some useful features for a User Domain implementation. Its global namespace follows DNS structure and uses LDAP to access objects within the directory service data store. It has location transparency to aid in nomadic access. It can find user, group (virtual user domain), networked service or resource (video channels allowed for that particular user), and data without the object address, requiring location specific domain login).

The authentication and services information also need not be stored within a single gateway. Instead, the gateway may securely communicate with another device (e.g., a master gateway or authentication system) such that the user may be authenticated remotely and the services available to the user may be provided or authorized from a remote device. Such a master gateway may be housed at one or more service providers. For example, the master gateway may belong to an Internet Service Provider (ISP) or another service provider such as a voice or video provider. In this way, when a subscriber moves from its home location to another location (e.g., a friend's house), the subscriber can reach the ISP or voice/video gateway to request that the ISP or voice/video provider temporarily send the subscriber's service to the friend. Thus, the subscriber can get to its Internet/voice/video services anywhere that it can reach the ISP or voice/video provider. Such a service will also allow peer-to-peer authentication between ISPs or voice/video providers in that the ISPs or voice/video providers can contact each other to ensure that the requester has the proper rights to support a request at a new location. ISPs or voice/video providers may provide such a service in order to provide maximum flexibility for their subscribers, despite having to open their networks to competitors. Moreover, such an open network regulation may eventually be required by governmental regulations.

A user entry in a user domain directory is an object of a user domain class with a rich set of properties managed by the service provider. Its property may include authentication type; child entry (for administrator), global unique identifier (as returned from the provider), name (under local directory service), parent element (such as service provider), etc.

Under the smith domain, user profiles remain enforced and adaptable to nomadic access at other user domain under trust relationship established by John. Uncle Smith's domain may have less children's channels, but Sarah will only be able to view those channels while she stays over at her cousin's home for the weekend. In some other access policies, tighter time limits between trusted domains, takes priority.

Under the present invention, a subscriber node can be viewed an abstraction of the voice, video, and data elements that constitute a user profile at the broadband customer endpoint. The domain administrator (e.g. John Smith), however, has selected from several service provider's templates what a particular user account in his domain includes.

As described earlier, users can have their rights obtained from the gateway (e.g., during a login process). When visiting another location, a user needs only its normal authentication information (e.g., its user identification and its password). If the user identification does not implicitly or explicitly contain the location of its original information, then the user will have to know where to find that information as well. The system can then handle the domain directory lookup and forward the user configuration of the corresponding sessions.

The subscriber application can be an internet data login, a video login (e.g., broadcast, switched, or on-demand viewing), VoIP, or an interactive multimedia session like video conferencing or gaming. Based on the login, and a check of the user profile (and if non-local access, a check on the trusted domain) and the underlying protocol (e.g. SIP, RTSP, SDP, RTP, or combinations that identifies an application), a user domain directory forwards service information that includes site, viewing, or other restrictions depending on the application being used. Additionally, it contains filters pre-defined by the domain administrator for allowed AAA mechanisms, group rights, QoS settings, specific services (e.g. remote site security monitoring/recording; "closed" circuit family video phone session; pay as you go gaming; etc), time schedule limitations, etc.

As an example herein, it is assumed that a user is initially configured such that it receives channels 1-4. However, when visiting another location, the administrator of the domain where the user is visiting has established a rule that channel 1 is inappropriate for viewing within the domain. As a result, the system performs an logical AND of the available channels such that (1-4 AND Not 1) yields channels 2-4. In this way, the administrator has the final control over what services can be brought into its domain.

As an alternative, the administrator may elect to have a logical OR domain in which a logical OR of services (e.g., channels) is possible within the domain. In that example, assuming that the domain administrator indicates that the logical OR is acceptable, if a friend that has ordered a pay-per-view fight comes over to watch the fight on a friend's larger screen, then the OR of their services (the hosts movie channels OR'd with the visiting friends pay-per-view) would result in the ability to watch the pay-per-view event at the new location.

As a result, the number of services can be thought of as a Venn diagram of the services available in the individual environments. Whether the Venn diagram is a logical OR diagram or a logical AND diagram depends on the conditions established by the administrator.

According to the present invention, the authentication may also be performed at locations other than a gateway. For example, in the context of video services, the present invention need not utilize a gateway if the video playback (or recording) device provides authentication services and control services itself. As previously described, a gateway can be notified by a domain administrator whether the administrator wants to utilize an AND or an OR configuration. In future versions of television receivers, the television receiver itself may include the intelligence of the gateway such that the television receiver itself can determine what channels should be available to a visitor to the televisions domain.

Authentication and service provision may also be shared between a normal gateway of a user and a gateway of a domain which the user is visiting. The authentication of the user may be passed from the visiting domain to the user's home domain in order to establish that the user is who he/she asserts he/she is. Authentication at a local or remote gateway may be in the form of any authentication protocol supported by the network, including, but not limited to user IDs and passwords, smart cards, biometrics, secure tokens (e.g., as are stored on devices such as may be connectable via a USB port or SecurID tokens/devices).

According to an embodiment of the present invention, a microprocessor and its corresponding memory perform the functions described herein. The microprocessor and its corresponding memory work together to store information on both the user specific domain information (e.g., what channels a particular user is allowed to watch) and the domain specific information (e.g., whether the administrator will allow the logical OR or the logical AND of the services provided natively within the administrator's domain). Such information, as described above can be stored in one or more locations in local or remote gateways, or in a combination thereof.

As would be appreciated by one of ordinary skill in the art, the various domain controllers can communicate with one another to perform authentications and to provide user-specific and domain specific information to the other domain controllers.

In yet another embodiment, client software interworks with head-end middleware and media gateways to manage subscriber sessions. In such an embodiment, a subscriber node may include a thin client that runs on any of the the aforementioned devices. It will retrieve a host of information about subscriber preferences, granular permissions & schedules, personal video recording settings, authentication, limitations, QoS, etc.

Numerous modifications of the above description can be made without departing from the scope of the present invention. As a result, the present invention is only limited by the scope of the appended claims.

The invention claimed is:

1. A method of causing a residential gateway to provide user-centric data services across a single broadband communications link, the method comprising:
  managing, at the residential gateway, a virtual user domain for accessing the single broadband communications link, different virtual user domains being established with respect to the single broadband communications link such that data from a public network is accessed via the single broadband communications link and the residential gateway based on usage characteristics of plural users;
  authenticating, at the residential gateway, a first user of the plural users to provide a first user-specific data access control to the first user across the single broadband communications link; and
  authenticating, at the residential gateway, a second user of the plural users to provide a second user-specific data access control to the second user across the single broadband communications link.

2. The method as claimed in claim 1, wherein the single broadband communications link comprises a Digital Subscriber Line (DSL) connection.

3. The method as claimed in claim 1, wherein the single broadband communications link comprises a cable modem connection.

4. The method as claimed in claim 1, wherein, in the residential gateway, the second user-specific data access control is compared to the first user-specific data access control by a logical OR to control whether the first user may access services through the single broadband communication link.

5. The method as claimed in claim 1, wherein, in the residential gateway, the second user-specific data access control is compared to the first user-specific data access control by a logical AND of the first user-specific data access control and a domain specific data access control to control whether the first user may access services through the single broadband communication link.

6. The method as claimed in claim 1, wherein the authenticating further comprises:
  providing a user identity and a password.

7. The method as claimed in claim 6, wherein the authenticating further comprises:
  providing a user identity and a password from the residential gateway to a remote device and receiving, at the residential gateway, a response from the remote device.

* * * * *